Patented Dec. 24, 1929

1,740,678

UNITED STATES PATENT OFFICE

WILHELM BORCHERS, OF AACHEN, GERMANY, AND ROBERT WICKERSHAM STIMSON, OF NEW YORK, N. Y.; SAID BORCHERS ASSIGNOR TO SAID STIMSON

ALLOY

No Drawing. Application filed April 14, 1924, Serial No. 706,540, and in Great Britain April 24, 1923.

This invention relates to the purification of liquid ferruginous metals of the class that contain any number of the elements chromium, molybdenum and uranium, and when desired other metallic and metalloidal components.

With regard to the state of the art it may be observed that early developments in open-hearth practice established means whereby a well known principle might be used namely: to effect the removal of oxidable impurities from metal baths by fusing thereon ore, or a reducible metallic oxid, together with a suitable flux. In later years processes have been devised whereby crude compound metals, such as of iron and chromium, are purified by fusing oxygenous materials, such as chromite, chromic oxid, the chromates and bichromates of calcium, sodium and the like, together with a flux, such as lime, in connection with a liquid crude metal.

Chromic oxid, the chromates and bichromates of calcium, potassium and the like are more potent oxidants than chromite and are more expensive. Moreover their employment presents in the way of difficulties those occasioned by the considerable differences that exist between their lower melting-points and that of the metal-bath, also the selection of fluxes to form suitable slags, and to coalesce with and prevent impurities from entering or remaining in the liquid metal. When lime is used with these oxidizing agents, its melting-point is so high that a considerable portion of the oxidants is vaporized and lost before the flux fulfils its function.

The chief object of the present invention is to remove oxidable impurities from molten metal by means of purifying agents that have the efficacy conferred by a rich state of oxygenation, also the economic advantage of melting-points approximating those of the metal-baths and are not subject to vaporization losses attributable to the co-employment of highly oxidated refining agents and calcarious fluxes. With this object in view we provide materials capable of functioning as purifying agents which are oxygenous aggregates of artificial mineral matter containing chromium, molybdenum or uranium, or any two or all of these metallic elements, while further characteristics are their ability to release a portion of their chemically combined oxygen whilst retaining their metallic elements in the form of oxygen compounds, their chemical basicity and their melting-points which are below 1500° C.

The present invention, therefore, regarded as a new or improved process of manufacturing purified ferruginous metals of all classes, types and grades that contain any number of the elements chromium, molybdenum and uranium, and wherein chromium, molybdenum and uranium are extracted from appropriate metalliferous materials by means of a metallurgical operation that comprises reduction and alloying actions and includes, or is followed by, purification treatment, is characterized by the employment, as the oxidizing agent, of an oxygenous aggregate of artificial mineral matter containing any number of the elements chromium, molybdenum and uranium, which oxidant has the property of liberating a portion of its chemically combined oxygen before any of its metallic compounds are metallized, also a basic chemical character, and a melting-point that is below 1500° C.

The highly oxygenated purifying agents, that are produced and employed according to the invention, have the following properties: they expedite purifying treatments; they require the application of little independent thermal energy as they function at a temperature below 1500° C.; they may be produced with such intensely basic chemical characters that a reactive or coalescing flux is not needed; also they may be given power to purify a metal-bath containing chromium, molybdenum or uranium without appreciably altering its composition as regards metallic elements.

The new oxidants are preferably produced by roasting under oxidizing conditions an intimate and suitably bound mixture of the following ingredients: (a) metalliferous stock consisting of an ore, concentrate, aggregate or by-product containing oxygen and chromium, molybdenum or uranium, or combinations thereof, which stock may be appropriately prepared as by being washed, calcined, crushed and the like, and (b) stable inorganic matter that has a strong basic chemical character and is appropriately prepared as by being calcined, crushed and the like. For the object hereinafter mentioned, it has been found that either calcium or magnesium monoxid is particularly suitable as the basic ingredient, that a stream of fresh air suitably provides free oxygen for oxygenating purposes, also that an aqueous solution of soda-ash is a suitable binding-agent.

Because it is in the greatest demand at this time we will explain the production and use according to the invention of a chromium-containing purifying agent, it being understood that no limitation is implied either to the procedure or to use of the particular materials that are mentioned for illustrative purposes. An intimate mixture of prepared preferably low-silica chromite and lime, having been bound together by means of an aqueous solution of soda-ash, is roasted and concurrently fed with a stream of fresh air or other oxidant. In this manner and by this means chromium and iron oxids contained in the mixture have their oxygen-contents almost doubled, while sulphur is substantially eliminated. Reactions that take place bring about the following transformations:—ferrous oxid (FeO) is converted into ferric oxid ($Fe_2O_3$) and by consecutive reactions chromic oxid ($Cr_2O_3$) first becomes an acid (the anhydrid being $CrO_3$) which reacts with the lime and basic binding-agent and forms salts—calcium and sodium chromates ($CaO.CrO_3$ and $Na_2O.CrO_3$).

For the following reasons the new oxidants are preferably caused to contain basic inorganic matter in excess of, and frequently more than twice, the quantity that would be employed if the purpose was to produce chromates, molybdates or uranates and ferric oxid:—

(1) Chromic, molybdic and uranic anhydrids are the most richly oxygenated oxids of the metals and are readily decomposable even at low temperatures. However, we have found that, when they are produced by roasting aggregates containing their lower oxids in the presence of free oxygen, they may be fixed for use at higher temperatures if at the moment of formation they are in intimate contact with an abundance of stable basic inorganic matter, with which they react and form highly oxygenated aggregates of artificial mineral matter. It is preferred, therefore, that the mixtures to be roasted shall include an excessive quantity of basic inorganic matter, and that the ingredients shall be in a fine state of division, to permit intimate contact, also well interdispersed.

(2) During the roasting treatment the closer the intimacy existing between the circulating oxygen and the lower oxids of chromium, molybdenum and uranium the more complete will oxidation become; hence it is desirable that the roasting mixtures be divided into the smallest particles that will permit the necessary circulation of oxygen, i. e., particles about the size of buckshot, and it is also desirable that the particles shall not become fused and thus interfere with oxygenation before salts of acids of any number of the elements chromium, molybdenum and uranium are formed. Agglomeration is avoided by raising the melting-points of the mixtures and for this purpose we may employ stable basic inorganic matter having a highly refractory nature, such as burnt lime or magnesia, and preferably in excess of the quantities that can unite and form salts with the acids, whereby more highly refractory aggregates are produced than is provided for in item (1). It will be understood that the temperature at which agglomeration takes place (usually about 1100° to 1200° C.) is not constant but will vary according to the silica-contents of the metalliferous stock and refractory basic inorganic matter that is available, and these variables must be considered when computing the proportions to be used.

(3) And in metallurgical refining actions the presence of a strong, non-reducible base is required to coalesce with silica and other impurities and form fusible slags.

As stated in item (2) enough of and sufficiently refractory stable, basic inorganic matter may be employed to keep the roasting mass in a porous condition and this presents a difficulty. Because of the differences that exist between their specific gravities there is a tendency for the components to separate when the mixtures are in the roasting-oven, and to overcome this it was found advisable to use a binding-agent but not in excess of quantities needed to cause the ingredients to adhere until salts of acids containing chromium, molybdenum and uranium are formed. And, to avoid deranging the reactions, the binding-agent is preferably a strong base, hence we may use for this purpose a carbonate or an hydroxid of an alkali metal or an alkaline earth metal, such as sodium carbonate, caustic soda and the like. It is preferred to apply the binding-agent in the form of an aqueous solution with which burnt lime is slaked to the consistency of a thin paste and then to knead the prepared metalliferous stock into it. The damp mass is thereupon dried and crushed into particles of favorable size.

In all cases sufficient stable basic inorganic matter is used, in the preparation of the new oxidants, to produce salts wherein it is united with chromic, molybdic or uranic anhydrid or related acids, and preferably it is employed in such excess of quantities required for this purpose as will endow the oxidizing materials with basic power that is strong enough to predominate over acid oxids produced in purifying reactions in which they take part, and thereby provide for the production of fusible basic final slags without the employment of a flux, such as lime As previously remarked, since the silica-contents of the required metalliferous stock and basic inorganic matter vary, it is necessary to alter the proportions in which they are used as occasion demands. Therefore, it will be understood that the scope of the invention and the appendant claims includes the employment of ingredients in any and all ratios and proportions that render the products suitable for use as oxidizing agents in the production of all kinds of ferruginous metal in which any number of the elements chromium, molybdenum and uranium are associated with, or it may be without, other components.

When refining ferro-alloys the addition of metallic elements extracted from the oxidants may be a matter of little consequence, although in the production of certain alloy steels to consist of for example, approximately 85% of iron and 15% of chromium, the addition of a small quantity of chromium may at times be injurious to the bath as it diminishes the malleability of the ingot metal. But in the production of all metals, to which the invention is directed it is highly undesirable that the elements chromium, molybdenum or uranium shall be permanently removed from the metal-baths by action of the oxidizing reagents or other influences. Usually it is difficult to estimate the quantities of metallic elements that will be extracted from oxidizing agents and precipitated into underlying metal-baths, also the quantities of metallic elements that will be oxidized and removed from the metal-baths, whereas it was found that by progressively altering the proportion of basic inorganic matter, as shown by a few sample tests, components of the new purifying agents may be regulated so that the latter contain substantially the quantities of super-oxidated chromium, molybdenum or uranium needed to replace—by means of their reduction at a prescribed temperature—losses of these metals that are sustained by metal-baths during their subjection to purifying treatments. By thus proportioning their ingredients the new oxidants are able to perform their function without setting up preponderating flows of metallic chromium, molybdenum or uranium either from the molten oxidizing agent to the metal-bath or vice versa.

To illustrate purifying treatment conducted according to the invention we may proceed as follows:—When the bath temperature is favorable slag covering the crude metal, which may be contained in an open-hearth, electric or other suitable furnace or reaction chamber, is raked off and immediately replaced with the appropriate oxidant as previously described. As is well known in the art when the bath temperature is controlled at about 1300° C. and the initial additions of basic purifying agents are completely replaced with a fresh supply not only silicon but phosphorous and part of the sulphur are permanently removed from the metal-bath, and when desirable this procedure is followed, after which, or otherwise as the case maye be, the bath temperature is preferably not permitted to exceed a relatively low but favorable carbon oxidizing zone, which is about 1500° to 1600° C., until the melt is being prepared for tapping.

If the slag becomes viscous toward the end of the operation we may add liquefacient fluxes, such as fluorspar, and reducible stock containing manganese or titanium oxid for the purposes of enhansing the liquidity of the slag and releasing gas that is entrapped therein (fluorspar without metallic oxids being employed when it is desirable to finish the heat with a non-oxidizing slag) and finally the bath temperature is increased to the degree that is most favorable to tapping. At any time prior to, during or subsequent to the purifying reactions bath additions may be made, as is most befitting to the character of the additions, also the refined metals may be given any desirable treatment, or treatments, before and after tapping to insure the states of deoxidation and degasification essential to the production of clean and sound ingot metal.

It is to be understood that the scope of this specification and the appendant claims includes the employment of the oxidizing materials, or agents, hereinbefore described for the purpose of purifying all kinds, by which is meant all classes, types and grades, of ferruginous metals in which any number of the elements chromium, molybdenum and uranium occur, which metals are without restrictions and reservations in all other respects such as:—the number of components of which the metals are made up, the quantities in which any and all components are contained, the specific metallic and metalloidal elements that comprise other components, and the manner in which or process whereby the crude metals are produced, also the purposes for which the purified metallic products may be intended and used. The following metals cited from those to which the invention is directed, will exemplify some of the classes and types concerned:—ferro-molybdenum, in which the iron-content is desirably as low as possible, and the so-called "rustless" irons and steels and alloy steels in which the element iron is a preponderating component, also acid resisting and other complex ferruginous metals that contain two, or more, metallic and metalloidal components and one or more of the elements chromium, molybdenum and uranium.

By the generic term "oxygenous aggregates of artificial mineral matter," as used in this specification and appendant claims, we mean oxygenous aggregates that are very largely or substantially composed of artificial mineral matter but not to the exclusion of small quantities of impurities, such as aluminates, silicates and the like, that are natural mineral matter or minerals. The adjective "mineral" is intended to convey:—pertaining to, consisting of, or resembling minerals. The adjective "ferruginous" is intended to convey:—carrying, or containing iron (Iron & Steel, Tiemann, 1919, page 172).

We claim:

1. In the manufacture of alloys, of all descriptions in which any number of the metals chromium, molybdenum and uranium is or are contained, by a process wherein the element iron and the alloying elements are admixed, the step of purifying a crude alloy with an oxygenous aggregate of artificial mineral matter that contains any number of the metals chromium, molybdenum and uranium.

2. In the production of alloys of any chemical composition and any class, type and grade in which any number of the metals chromium, molybdenum and uranium is or are present, the step of treating a crude alloy with an oxygenous aggregate of artificial mineral matter which contains at least one of the elements chromium, molybdenum and uranium and has the special property of liberating part of its chemically combined oxygen before any of its metallic compounds are metallized.

3. In the production of alloys of all sorts in which any number of the metals chromium, molybdenum and uranium is or are present, the step of treating a crude alloy with an oxygenous aggregate of artificial mineral matter that contains any number of the metals chromium, molybdenum and uranium and possesses a basic chemical character.

4. In the manufacture of alloys of all descriptions that contain any number of the metals chromium, molybdenum and uranium, the step of treating a crude alloy with an oxygenous aggregate of artificial mineral matter that contains any number of the metals chromium, molybdenum and uranium and has a melting-point which is below 1500° C.

5. In the manufacture of alloys of all descriptions that contain any number of the metals chromium, molybdenum and uranium, the step of treating a crude alloy with a basic, oxygenous aggregate of artificial mineral matter that contains any number of the metals chromium, molybdenum and uranium and has a melting-point which is below 1500° C.

6. In the production of metallic alloys by a process as set forth in claim 1, the step of imparting sufficient thermal energy to material comprising an oxygenous aggregate of artificial mineral matter, which contains any number of the elements chromium, molybdenum and uranium and is lying over a liquid metallic alloy, to start and accomplish purifying reactions.

7. Material for use as an oxidizing agent in the production of purified metallic alloys of all descriptions that contain any number of the metals chromium, molybdenum and uranium, which is a super-oxygenated aggregate of artificial mineral matter that contains any number of the elements chromium, molybdenum and uranium.

8. Material for use as an oxidizing agent in the production of purified, metallic alloys of all descriptions that contain any number of the metals chromium, molybdenum and uranium, which is a super-oxygenated aggregate of artificial mineral matter that has a basic chemical character and contains any number of the elements chromium, molybdenum and uranium.

9. Material for use as an oxidizing agent in the production of purified metallic alloys of all descriptions that contain any number of the metals chromium, molybdenum and uranium, which is a super-oxygenated aggregate of artificial mineral matter that has a melting-point which is below 1500° C. and contains any number of the elements chromium, molybdenum and uranium.

10. A process of producing an oxidizing agent for use in the production of purified metallic alloys, which comprehends intimately mixing metalliferous stock containing any number of the elements chromium, molybdenum and uranium, with stable, basic inorganic matter, and heating the mixture in the presence of free oxygen.

11. A process of producing an oxidizing agent for use in the production of purified metallic alloys, which comprehends mixing prepared, metalliferous matter containing any number of the elements chromium, molybdenum and uranium, with stable, strongly basic inorganic matter, incorporating therewith a basic binding agent, and roasting the product in the presence of free oxygen.

12. A process of producing an oxidizing agent for use in the production of purified alloys, which comprehends forming a thin paste by slaking burnt lime in an aqueous solution of soda ash; mixing prepared metalliferous matter containing any number of the elements chromium, molybdenum and uranium, into the paste; drying, and then crushing the mass, and, finally, roasting the product in an abundance of air.

13. A process of producing an oxidizing agent for use in the production of purified alloys, which comprehends intimately mixing a quantity of metalliferous matter containing any number of the elements chromium, molybdenum and uranium, with stable, basic inorganic matter sufficient basic inorganic matter being used to provide a surplus over the quantity required to form a salt with all of the metallic acid, or acids, that can be produced with the quantity of metalliferous material employed, and thereafter roasting the mixture in the presence of an abundance of free oxygen.

W. BORCHERS.
R. W. STIMSON.